(12) United States Patent
Sakai et al.

(10) Patent No.: US 9,038,798 B2
(45) Date of Patent: May 26, 2015

(54) SHAFT CONNECTION STRUCTURE AND SHAFT CONNECTION METHOD

(75) Inventors: Hiroyuki Sakai, Shanghai (CN); Kazutoshi Yoshida, Ota (JP); Norihiro Maezato, Nagoya (JP)

(73) Assignee: MEIDENSHA CORPORATION, Tokyo (JP)

( * ) Notice: Subject to any disclaimer, the term of this patent is extended or adjusted under 35 U.S.C. 154(b) by 147 days.

(21) Appl. No.: 13/702,906

(22) PCT Filed: Jun. 10, 2011

(86) PCT No.: PCT/JP2011/063373
§ 371 (c)(1),
(2), (4) Date: Dec. 7, 2012

(87) PCT Pub. No.: WO2011/155601
PCT Pub. Date: Dec. 15, 2011

(65) Prior Publication Data
US 2013/0081919 A1    Apr. 4, 2013

(30) Foreign Application Priority Data

Jun. 10, 2010 (JP) ................................. 2010-132624
Apr. 4, 2011 (JP) ................................. 2011-082868

(51) Int. Cl.
*F16D 11/14* (2006.01)
*G01M 15/02* (2006.01)
(Continued)

(52) U.S. Cl.
CPC ................ *F16D 11/10* (2013.01); *F16D 11/14* (2013.01); *G01M 15/02* (2013.01); *F16D 1/108* (2013.01)

(58) Field of Classification Search
CPC ............................. G01M 15/00; G01M 15/02
USPC ........................ 192/69.9; 464/158; 73/116.05
See application file for complete search history.

(56) References Cited

U.S. PATENT DOCUMENTS 2,823,527 A * 2/1958 Belden et al. ................. 464/158
4,003,218 A * 1/1977 Filderman ..................... 464/106
(Continued)

FOREIGN PATENT DOCUMENTS

CN           1854704 A      11/2006
JP       01-007853 Y2       3/1989
(Continued)

OTHER PUBLICATIONS

Machine translation of JP 2000-257647 A downloaded from epo.org on Jan. 17, 2015.*
(Continued)

*Primary Examiner* — Richard Lorence
(74) *Attorney, Agent, or Firm* — Foley & Lardner LLP

(57) ABSTRACT

A shaft connection structure connects a pair of rotating shafts by a fit between a pair of spline shafts, wherein the pair of rotating shafts are provided with corresponding ones of the pair of spline shafts. The shaft connection structure includes a shaft connection assist device. The shaft connection assist device includes a centering ring and centering pins. The centering ring is arranged outside of a first one of the spline shafts and coaxially with the first spline shaft. The centering pins are provided outside of a second one of the spline shafts. The centering pins engage with an outer peripheral surface of the centering ring and bring a shaft axis of the first spline shaft and a shaft axis of the second spline shaft into a range enabling the fit therebetween.

18 Claims, 13 Drawing Sheets

(51) Int. Cl.
*F16D 11/10* (2006.01)
*F16D 1/108* (2006.01)

(56) References Cited

U.S. PATENT DOCUMENTS 4,018,062 A * 4/1977 Bulliot ........................ 464/158
6,390,925 B1 5/2002 Perrow

FOREIGN PATENT DOCUMENTS

| JP | 02-010432 | Y2 | 3/1990 |
| JP | 07-310751 | A | 11/1995 |
| JP | 2000-257647 | A | 9/2000 |
| JP | 2003-294583 | A | 10/2003 |
| JP | 2006-300116 | A | 11/2006 |
| JP | 2009-204002 | A | 9/2009 |

OTHER PUBLICATIONS

Chinese Office Action and English Language translation dated Aug. 5, 2014, 19 pgs.

* cited by examiner

SHAFT CONNECTION STRUCTURE AND SHAFT CONNECTION METHOD

TECHNICAL FIELD

The present invention relates to shaft connection structure and shaft connection method for attaching a spline shaft to an end part of each of a pair of rotating shafts that are to be connected to each other, and connecting the rotating shafts to each other by a fit between the spline shafts.

BACKGROUND ART

Connection between rotating shafts, for example, in a case that a rotating shaft of a product under test such as an engine is connected to a rotating shaft of a testing device such as a dynamometer, is implemented as shown in FIG. 15, as follows. A spline shaft 104 is attached to a rotating shaft of a product under test 103 such as an engine which is mounted on a pedestal 101 through a rubber mount member 102. On the other hand, a spline shaft 107, with which the spline shaft 104 is fitted through a universal joint 106 and others, is attached to a rotating shaft (shaft to be connected) 105 of a testing device (not shown) such as a dynamometer. The spline shaft 107 is supported by a shaft support member 108.

The rotating shaft of the product under test is connected to the rotating shaft of the testing device by moving the shaft support member 108 by a shaft support member drive mechanism 109 such as an air cylinder toward the product under test 103, and thereby causing the spline shaft 104 to fit in spline shaft 107. If there is a deviation in axis between spline shaft 107 and spline shaft 104, the deviation is absorbed by the universal joint 106 and others (see patent documents 1-3, for example).

PRIOR ART DOCUMENT

Patent document

Patent document 1: JP H01-7853 Y2
Patent document 2: JP H02-10432 Y2
Patent document 3: JP 2006-300116 A

SUMMARY OF THE INVENTION

Problem(s) to be Solved by the Invention

When spline shafts are fitted with each other, it is necessary to set a deviation in shaft axis between the spline shafts within a range enabling the fit therebetween. Accordingly, it is necessary to accurately set the position of the rotating shaft of the product under test and the position of the spline shaft at a distal end of the testing device within the range enabling the fit therebetween.

Moreover, even for a shaft connection device that is capable of absorbing by a universal joint and others a deviation in axis between a rotating shaft of a product under test and a rotating shaft of a testing device, it is necessary to move a spline shaft of the testing device side vertically, horizontally, and the like, for actually absorbing the deviation and bringing the shaft axes of the spline shafts into the range enabling the fit therebetween. This operation actually requires a lot of work load. This lot of work load results in an increase in a total period of time for testing.

It is an object of the present invention to provide a shaft connection structure and a shaft connection method which can perform an operation of shaft axis alignment and prevent shaft runout after connection between spline shafts.

Means for Solving the Problem(s)

The invention according to a first feature is a shaft connection structure for connecting a pair of rotating shafts by a fit between a pair of spline shafts, wherein the pair of rotating shafts are provided with corresponding ones of the pair of spline shafts, characterized by comprising a shaft connection assist device, wherein the shaft connection assist device comprises: a centering ring arranged outside of a first one of the spline shafts and coaxially with the first spline shaft; and centering pins provided outside of a second one of the spline shafts, wherein the centering pins engage with an outer peripheral surface of the centering ring and bring a shaft axis of the first spline shaft and a shaft axis of the second spline shaft into a range enabling the fit therebetween.

The invention according to a second feature is the shaft connection structure as in the first feature, characterized in that: each of the centering pins comprises a cylindrical part and a conical part; the cylindrical part engages with the outer peripheral surface of the centering ring and positions the centering ring; and the conical part is provided at a distal end of the cylindrical part, and brings the shaft axes of the pair of spline shafts into the range enabling the fit therebetween by abutting on the outer peripheral surface of the centering ring.

The invention according to a third feature is the shaft connection structure as in the second feature, characterized in that: the cylindrical part includes a flange part; and the flange part gets into contact with a distal end surface of the centering ring, when the cylindrical part engages with the outer peripheral surface of the centering ring.

The invention according to a fourth feature is the shaft connection structure as in any one of the first to third feature, characterized in that: one of the pair of rotating shafts to be connected to each other is a rotating shaft of a product under test; another one of the pair of rotating shafts is a rotating shaft of a testing device for testing the product under test; the first spline shaft is attached to the rotating shaft of the product under test; the second spline shaft is attached to the rotating shaft of the testing device; the second spline shaft is attached to a shaft support member; axial movement of the shaft support member is allowed by a shaft support member drive member; and axial movement of each of the centering pins is allowed by a pin drive member.

The invention according to a fifth feature is the shaft connection structure as in the fourth feature, characterized in that: the pin drive member causes tree or more of the centering pins to travel individually toward the product under test for engaging with the outer peripheral surface of the centering ring and bringing the shaft axis of the first spline shaft and the shaft axis of the second spline shaft into the range enabling the fit therebetween; and the shaft support member drive member causes the shaft support member to travel toward the product under test for causing the fit between the first spline shaft and the second spline shaft.

The invention according to a sixth feature is the shaft connection structure as in the fourth or fifth feature, characterized in that the shaft support member drive member and the pin drive member are air cylinders.

The invention according to a seventh feature is the shaft connection structure as in the fourth or fifth feature, characterized in that the shaft support member drive member and the pin drive member are servo motors or hydraulic cylinders.

The invention according to an eighth feature is a shaft connection method, characterized by comprising: attaching a first spline shaft to a rotating shaft of a product under test; arranging a centering ring outside of the first spline shaft and coaxially with the first spline shaft; attaching a second spline shaft to a rotating shaft of a testing device for testing the product under test; attaching a plurality of centering pins to a shaft support member to which the second spline shaft is attached, in a manner to allow axial movement of the centering pins by a pin drive member; allowing axial movement of the shaft support member by a shaft support member drive member; causing by the pin drive member the plurality of centering pins to travel toward the product under test, and engage with the outer peripheral surface of the centering ring, and bring the shaft axis of the first spline shaft and the shaft axis of the second spline shaft into the range enabling the fit therebetween; and thereafter causing the second spline shaft to travel forward and cause the fit between the first spline shaft and the second spline shaft.

The invention according to a ninth feature is the shaft connection method as in the eighth feature, characterized by: a step of causing by an auxiliary air cylinder the plurality of centering pins to project toward the product under test with respect to a distal end surface of the spline shaft attached to the testing device, when in a standby position; a step of causing by a main air cylinder the shaft support member to travel toward the product under test under condition that the plurality of centering pins are made to project toward the product under test, and eliminate a deviation between the shaft axes of the spline shafts by the centering ring and the plurality of centering pins; a step of detecting whether all of the centering pins engage with the outer peripheral surface of the centering ring and the shaft axes of the spline shafts are in the range enabling the fit therebetween; a step of opening a valve of the auxiliary air cylinder after completion of alignment of the shaft axes of the spline shafts, and causing by the main air cylinder the shaft support member to travel, and cause the fit between the spline shafts, and cause the distal end surface of the spline shaft attached to the testing device to get in contact with a bottom surface part of the centering ring; a step of making the distal end surface of the spline shaft attached to the testing device and the bottom surface part of the centering ring out of contact with each other by producing a clearance therebetween; and a step of making the centering pins out of contact with the centering ring by producing clearances therebetween.

The invention according to a tenth feature is the shaft connection structure as in the first feature, characterized in that: the pair of spline shafts are provided with a shaft runout prevention mechanism; the shaft runout prevention mechanism comprises a locating pin and a bush; and the locating pin and the bush is brought into intimate contact with and fitted with each other at spline connection.

The invention according to an eleventh feature is the shaft connection structure as in the tenth feature, characterized in that: the first spline shaft is cylindrically shaped with a spline tooth at an outer peripheral surface; the second spline shaft is hollow-cylindrically shaped with a spline tooth at an inner peripheral surface; the spline tooth of the second spline shaft meshes with the spline tooth of the first spline shaft; the locating pin is cylindrically shaped, and disposed at a distal end surface of a connection part of the cylindrical first spline shaft; and the bush is hollow-cylindrically shaped, and disposed inside of the hollow-cylindrically shaped second spline shaft.

The invention according to a twelfth feature is the shaft connection structure as in the tenth or eleventh feature, characterized in that: the locating pin includes a small-diameter shaft part and a large-diameter shaft part; the large-diameter shaft part is continuous with a distal end of the small-diameter shaft part; the bush includes a small-inner-diameter part and a large-inner-diameter part; the large-inner-diameter part is continuous with the small-inner-diameter part; fitting between the locating pin and the bush brings an outer surface of the large-diameter shaft part of the locating pin into contact with an inner surface of the small-inner-diameter part of the bush.

The invention according to a thirteenth feature is the shaft connection structure as in any one of the tenth to twelfth feature, characterized in that at least one of the large-diameter shaft part of the locating pin and the small-inner-diameter part of the bush includes an insertion guide surface for guiding insertion of the other.

The invention according to a fourteenth feature is the shaft connection structure as in any one of the tenth to thirteenth feature, characterized in that at least one of the locating pin and the bush is attachable to and detachable from at least one of the distal end surface of the first spline shaft and the inner surface of the second spline shaft.

The invention according to a fifteenth feature is the shaft connection structure as in any one of the tenth to fourteenth feature, characterized in that: the first spline shaft is provided at the rotating shaft of the product under test to be tested by a dynamometer; and the second spline shaft is provided at the rotating shaft of the dynamometer.

The invention according to a sixteenth feature is the shaft connection structure as in the fifteenth feature, characterized in that: the second spline shaft is rotatably supported by a pair of bearings with respect to the shaft support member; and the inner peripheral surface of the small-inner-diameter part of the bush configured to be in contact with the locating pin is located inside of the pair of bearings.

The invention according to a seventeenth feature is the shaft connection structure as in the sixteenth feature, characterized in that the shaft support member is of a floating type.

The invention according to an eighteenth feature is the shaft connection structure as in any one of the tenth to seventeenth feature, characterized in that the locating pin is made of synthetic resin or rubber.

The invention according to a nineteenth feature is a shaft connection structure wherein: a first spline shaft cylindrically shaped, and provided with a spline tooth at an outer peripheral surface; a second spline shaft hollow-cylindrically shaped, and provided with a spline tooth at an inner peripheral surface; and the spline tooth of the second spline shaft meshes with the spline tooth of the first spline shaft; characterized in that: a cylindrically shaped locating pin is disposed at a distal end surface of a connection part of the cylindrically shaped first spline shaft; a hollow-cylindrically shaped bush is disposed inside of the hollow-cylindrically shaped second spline shaft; the pair of spline shafts are provided with a shaft runout prevention mechanism; the shaft runout prevention mechanism comprises a locating pin and a bush; and the locating pin and the bush are brought into intimate contact with and fitted with each other at spline connection.

Effect(s) of the Invention (1) According to the shaft connection structure of the first feature, it is possible to easily and reliably achieve the fit between the spline shafts, because prior to the fit between the spline shafts, the plurality centering pins are made to engage with the outer peripheral surface of the centering ring, to bring the shaft axes of the spline shafts into the range enabling the fit therebetween.

(2) According to the shaft connection structure of the second feature, in a case where the shaft axes of a pair of spline shafts are deviated from each other when the pair of spline shafts are made to fit with each other, the inclined surfaces of the conical parts of the centering pins are brought into contact with the outer periphery of the distal end surface of the centering ring so that the centering ring is guided into an annular space defined by the plurality of centering pins. Then, the outer peripheral surfaces of cylindrical parts of the plurality of centering pins engage with the outer peripheral surface of the centering ring, and bring the shaft axes of the spline shafts into the range enabling the fit therebetween.

(3) According to the shaft connection structure of the third feature, the feature that the contact switch or the like is arranged at the contact surface between the flange part and the centering ring, makes it possible to easily detect the fit between the cylindrical part and the outer peripheral surface of the centering ring.

(4) According to the shaft connection structure of the fourth feature, it is possible to easily and reliably complete spline connection by the rotating shaft of the product under test, the rotating shaft of the testing device for testing the product under test, the centering ring, and the plurality of centering pins.

(5) According to the shaft connection structure of the fifth feature, it is possible to cause by the pin drive member the plurality of centering pins to travel toward the product under test, and engage with the outer peripheral surface of the centering ring, and bring the shaft axes of the spline shafts into the range enabling the fit therebetween, and thereafter cause the shaft support member by the shaft support member drive member to travel toward the product under test, and cause the fit between the spline shafts.

(6) According to the shaft connection structure of the sixth feature, the feature that the pin drive member and the shaft support member drive member are implemented by air cylinders, makes it possible to produce the members more simply at lower cost than in cases where the members are implemented by serve motors.

(7) According to the shaft connection structure of the seventh feature, the feature that the pin drive member and the shaft support member drive member are implemented by servo motors or hydraulic cylinders, serves to enhance the accuracy of the stop positions of the centering ring and the shaft support member. Accordingly, it is possible to more easily produce the clearance or the like between the distal end of the spline shaft attached to the testing device and the bottom surface part of the centering ring than in cases where they are implemented by air cylinders.

(8) According to the shaft connection method of the eighth feature, it is possible to cause by the pin drive member the plurality of centering pins to travel, get in contact with the outer peripheral surface of the centering ring, and bring the shaft axes of the spline shafts into the range enabling the fit therebetween, and thereafter cause the first spline shaft to travel toward the product under test and cause the fit between the spline shafts.

(9) According to the shaft connection method of the ninth feature, the feature of making the distal end of the spline shaft attached to the tenting device and the bottom surface part of the centering ring out of contact with each other, makes it possible to perform an engine test without causing frictional resistances between the spline shaft attached to the testing device and the centering ring and between the centering ring and the centering pins.

(10) According to the shaft connection structure of the tenth feature, when the pair of spline shafts are fitted with each other, the locating pin and bush provided in the pair of spline shafts are fitted with each other, namely, fitted with each other with no clearance, thus preventing the occurrence of shaft runout and the like.

(11) According to the shaft connection structure of the eleventh feature, when the pair of spline shafts are fitted with each other, the locating pin provided in the first spline shaft fits into the bush provided at the inner periphery of the second spline shaft, thus connecting the locating pin and the bush integrally, and preventing the occurrence of shaft runout and the like.

(12) According to the shaft connection structure of the twelfth feature, the feature that the outer surface of the large diameter shaft part of the locating pin is made to be partly in contact with the inner surface of the small inner diameter part of the bush, makes it possible to enhance the accuracy of diameter and surface of the these parts, bring the outer surface of the large diameter shaft part and the inner surface of the bush into intimate contact with each other, and prevent the occurrence of shaft runout and the like. This makes it easy to process the contact surface as compared to cases the entire outer surface of the locating pin and the entire inner surface of the bush are made into uniform contact with each other.

(13) According to the shaft connection structure of the thirteenth feature, the insertion guide surfaces formed at the large diameter shaft part of the locating pin and/or the distal end portion of the small inner diameter part of the bush, makes it possible to smoothly fit the locating pin and the bush with each other.

(14) According to the shaft connection structure of the fourteenth feature, the feature that at least one of the locating pin and the bush is attachable and detachable as necessary, makes it possible to easily repair or change parts.

(15) According to the shaft connection structure of the fifteenth feature, the feature that the rotating shaft of the product under test such as an engine and the rotating shaft of the dynamometer that tests the product under test, makes it possible to carry out a performance test of the product under test under condition that shaft runout and the occurrence of resonance are suppressed.

(16) According to the shaft connection structure of the sixteenth feature, the feature that when the locating pin is fitted with the bush, the inner peripheral surface of the small inner diameter part of the bush to be in contact with the locating pin, is arranged inside of the pair of bearings, serves to further suppress shaft runout.

(17) According to the shaft connection structure of the seventeenth feature, it is possible to more reliably prevent shaft runout and the occurrence of resonance, even in cases where a floating type shaft support member is used so that the possibility of shaft runout and the occurrence of resonance is high.

(18) According to the shaft connection structure of the eighteenth feature, the feature that the locating pin is made of a self-lubricating and/or elastic material such as synthetic resin or rubber, serves to smooth the fit as compared to cases where it is made of metal.

(19) According to the shaft connection structure of the nineteenth feature, when the male and female spline shafts are fitted with each other, the locating pin and bush provided in the spline shafts are fitted with each other, namely, fitted with each other with no clearance, thus preventing shaft runout and the like.

MODE(S) FOR CARRYING OUT THE INVENTION

Figure 1:
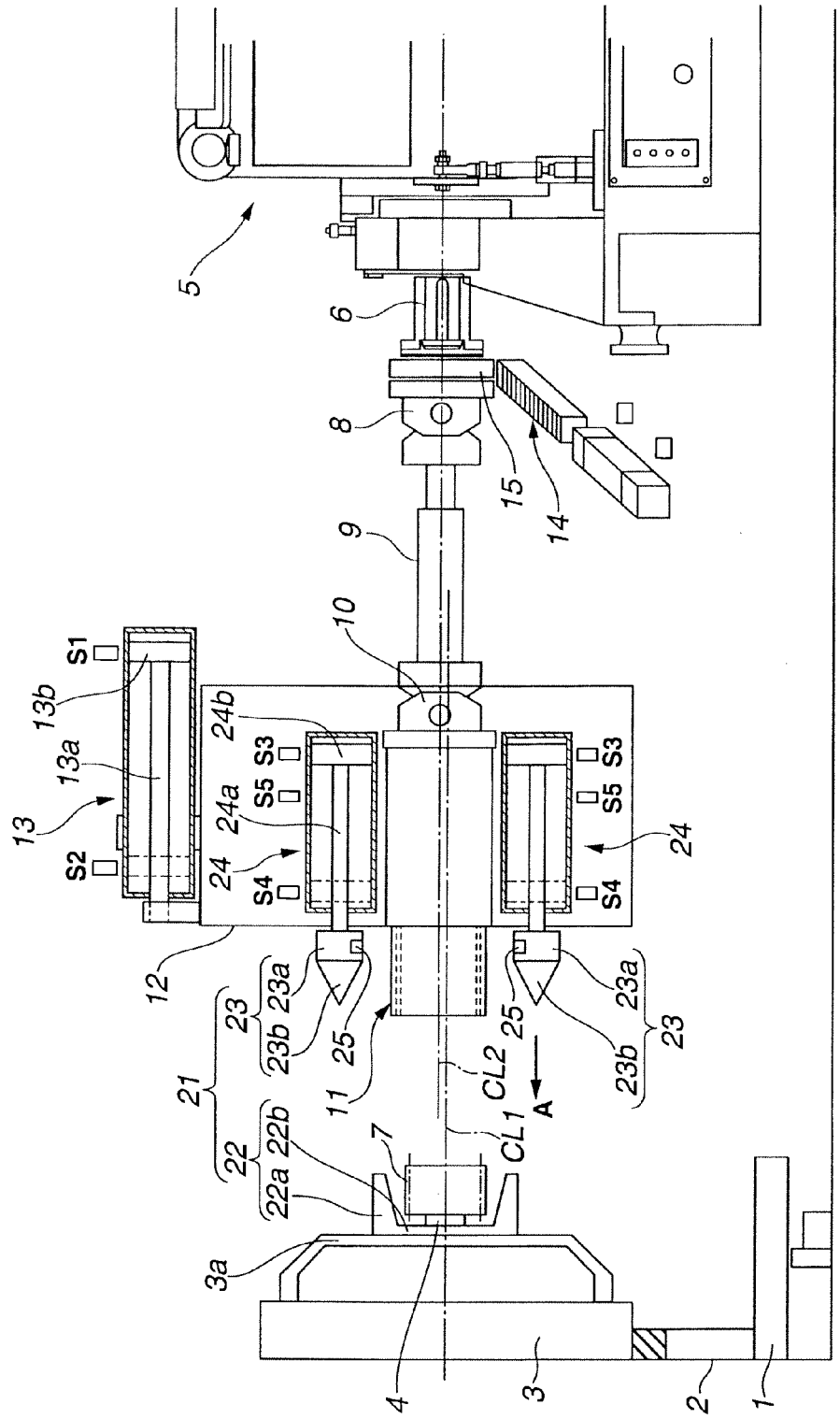
FIG. 1 is an illustration diagram showing a shaft connection structure provided with a shaft connection assist device.
Figure 14:
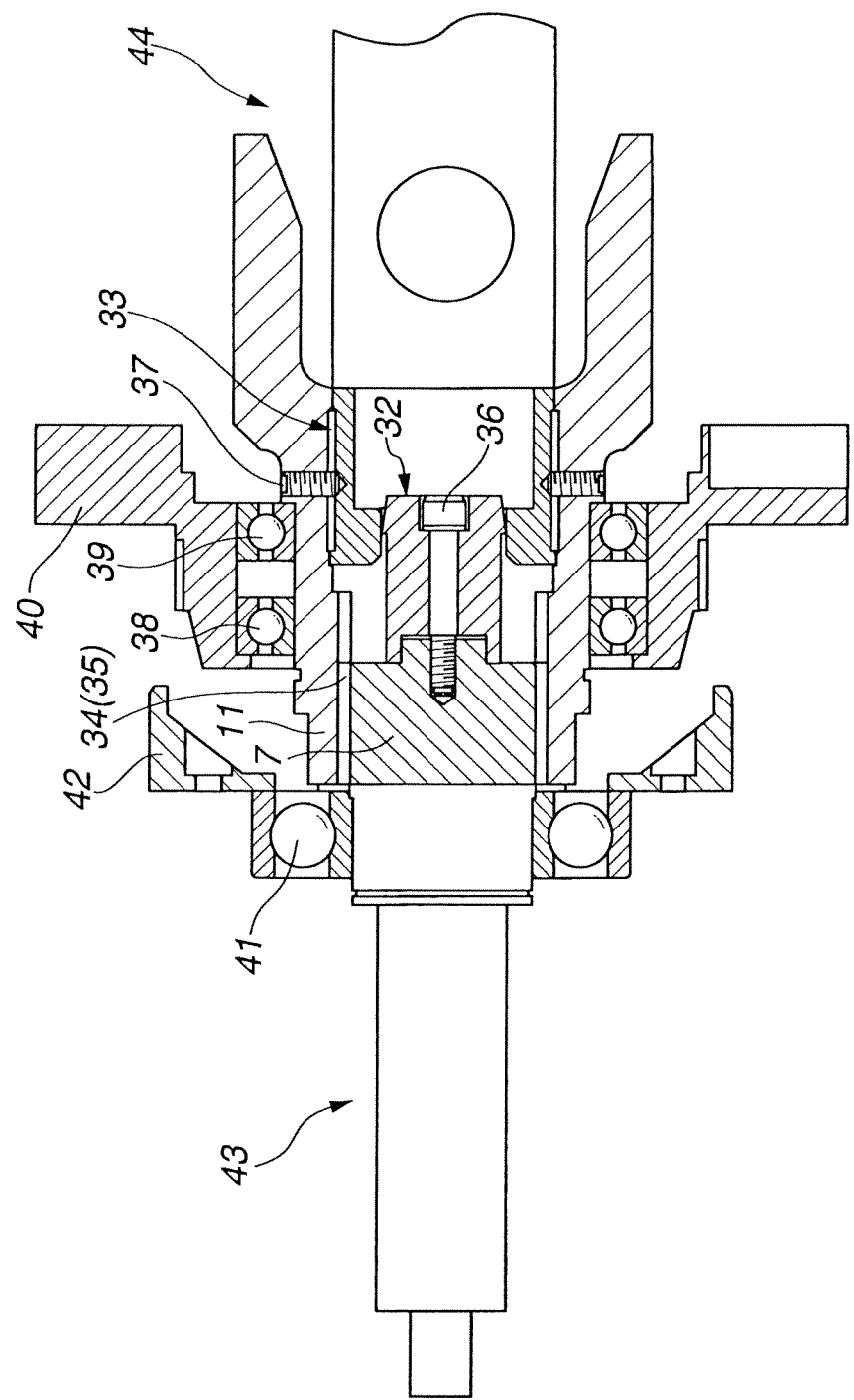
FIG. 14 is a cross-sectional view of a condition where the locating pin and the bush are fitted with each other.
Figure 15:
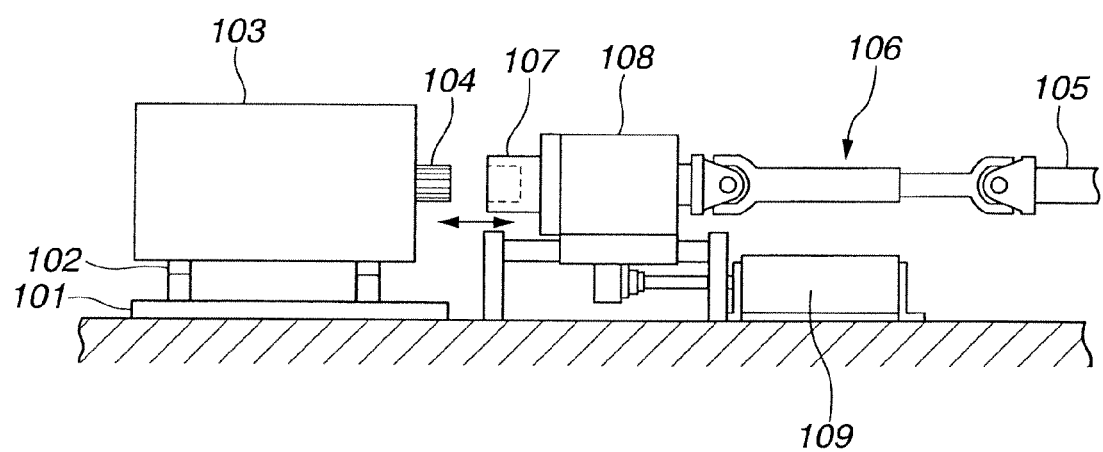
FIG. 15 is an illustration diagram showing a conventional example.

FIGS. 1 to 7 show a first embodiment. In a case where rotating shafts are connected to each other and various kinds of testing are performed, a rotating shaft (shaft to be connected) 6 of a dynamometer 5 is connected to a rotating shaft 4 of an engine 3 as a product under test which is mounted on a pedestal 1 through a rubber mount to member 2, as shown in FIG. 1, for example. In a case where engine 3 is tested, a first spline shaft 7 is attached to rotating shaft 4 of engine 3, whereas a second spline shaft 11 is connected to rotating shaft 6 of dynamometer 5 through a telescopic universal joint 8, 9, 10. In FIGS. 1, 14 and 15 represent a rack and a pinion for rotating the spline shaft 11 and thereby conforming recessed portions (valleys) of spline shaft 7 to projecting portions (mountains) of spline shaft 11.

Spline shaft 11 is attached to a shaft support member 12. Shaft support member 12 is connected to a distal end of a piston rod 13a of an air cylinder (henceforth referred to as main air cylinder) 13 as a shaft support member drive member, and configured to travel in an axial direction (in the horizontal direction in FIG. 1). Shaft support member 12 has a structure (as in JP 2006-300116 A) not shown for supporting the spline shaft 11 while allowing horizontal travel, vertical travel, and the like, of spline shaft 11, and thereby absorb a deviation in axis between the rotating shaft of the product under test and the rotating shaft of the testing device, when the deviation is present. 13b represents a piston of main air cylinder 13.

Figure 2:
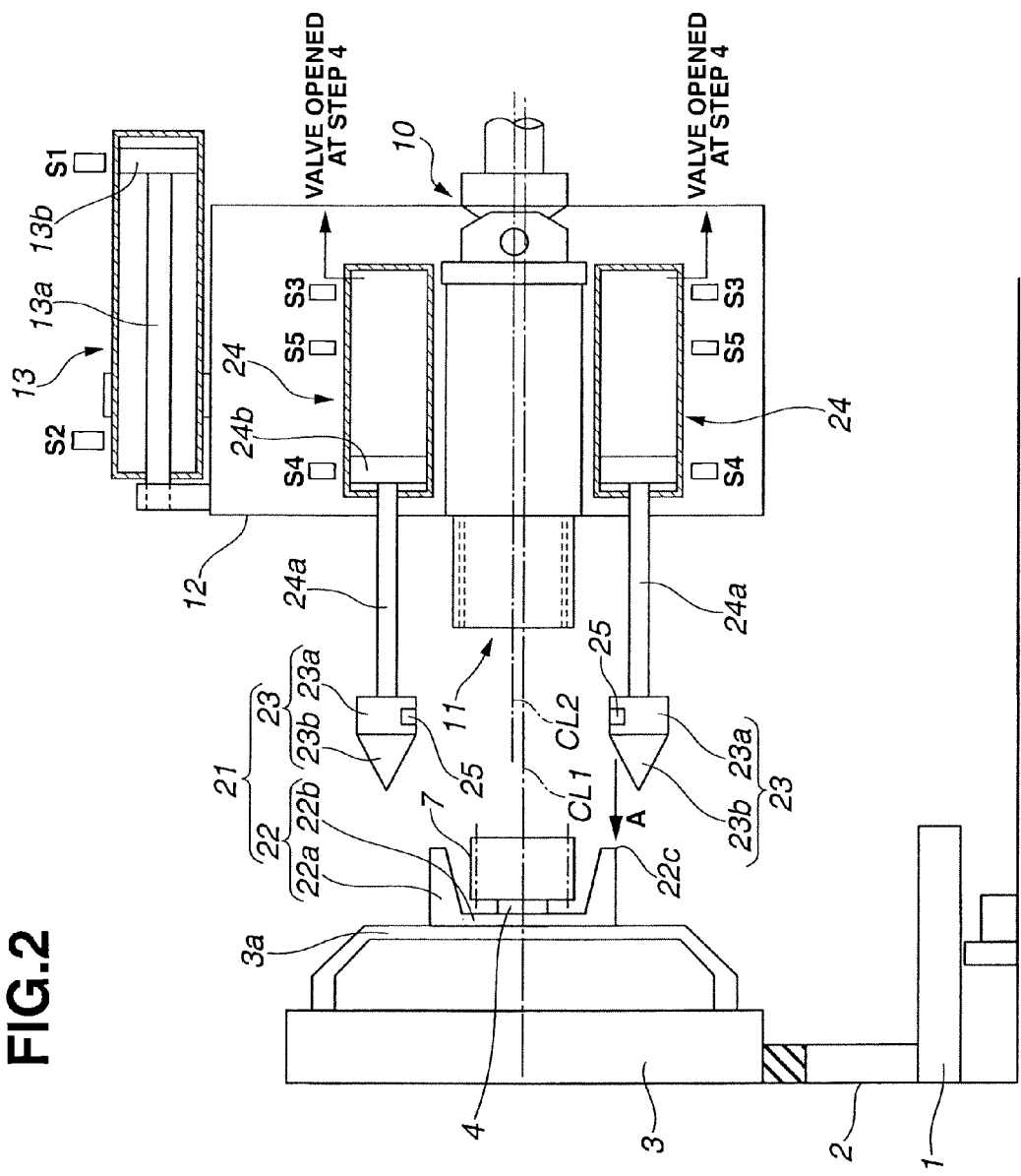
FIG. 2 is an illustration diagram showing Step 1 of a shaft connection method.
Figure 3:
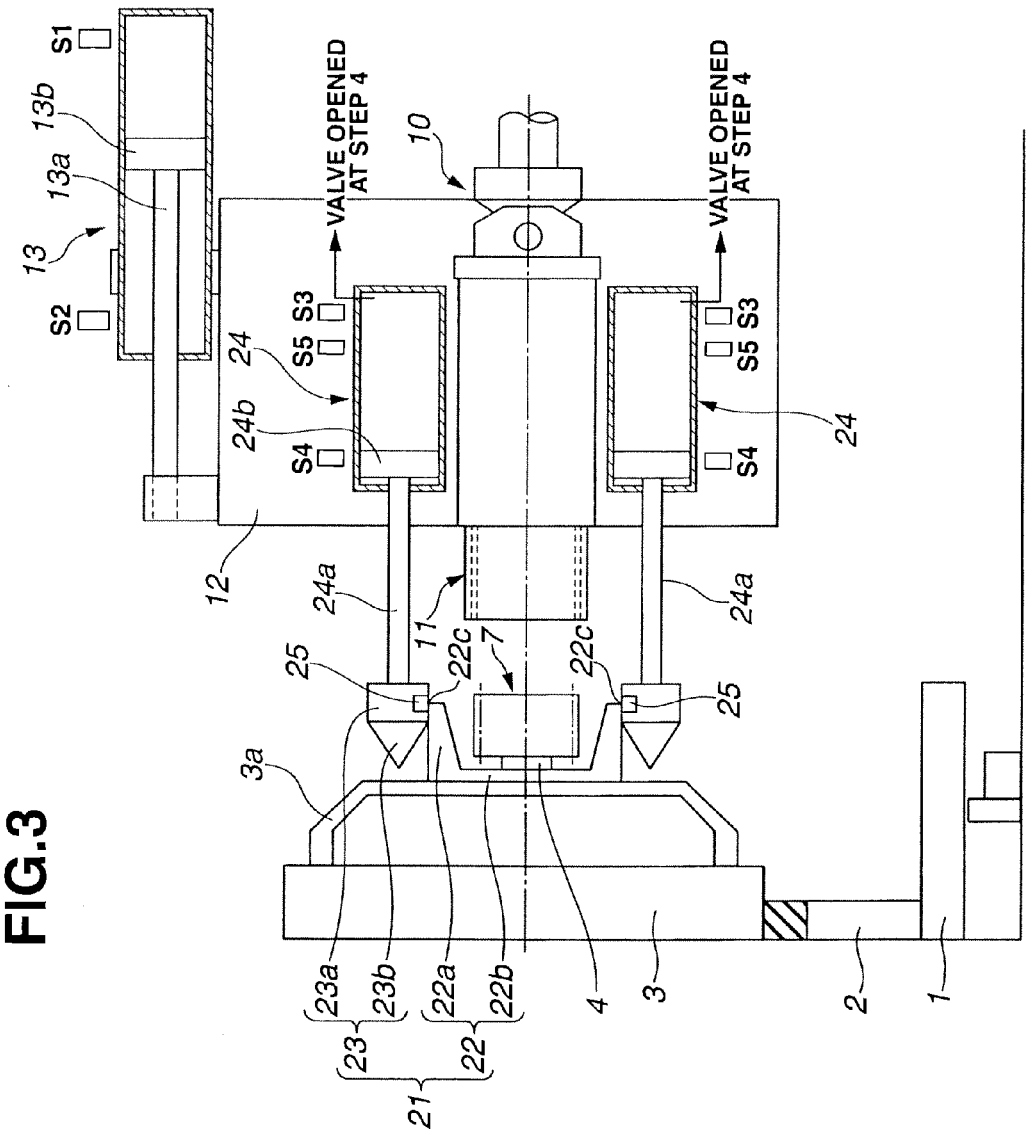
FIG. 3 is an illustration diagram showing Steps 2 to 4 of the shaft connection method.
Figure 4:
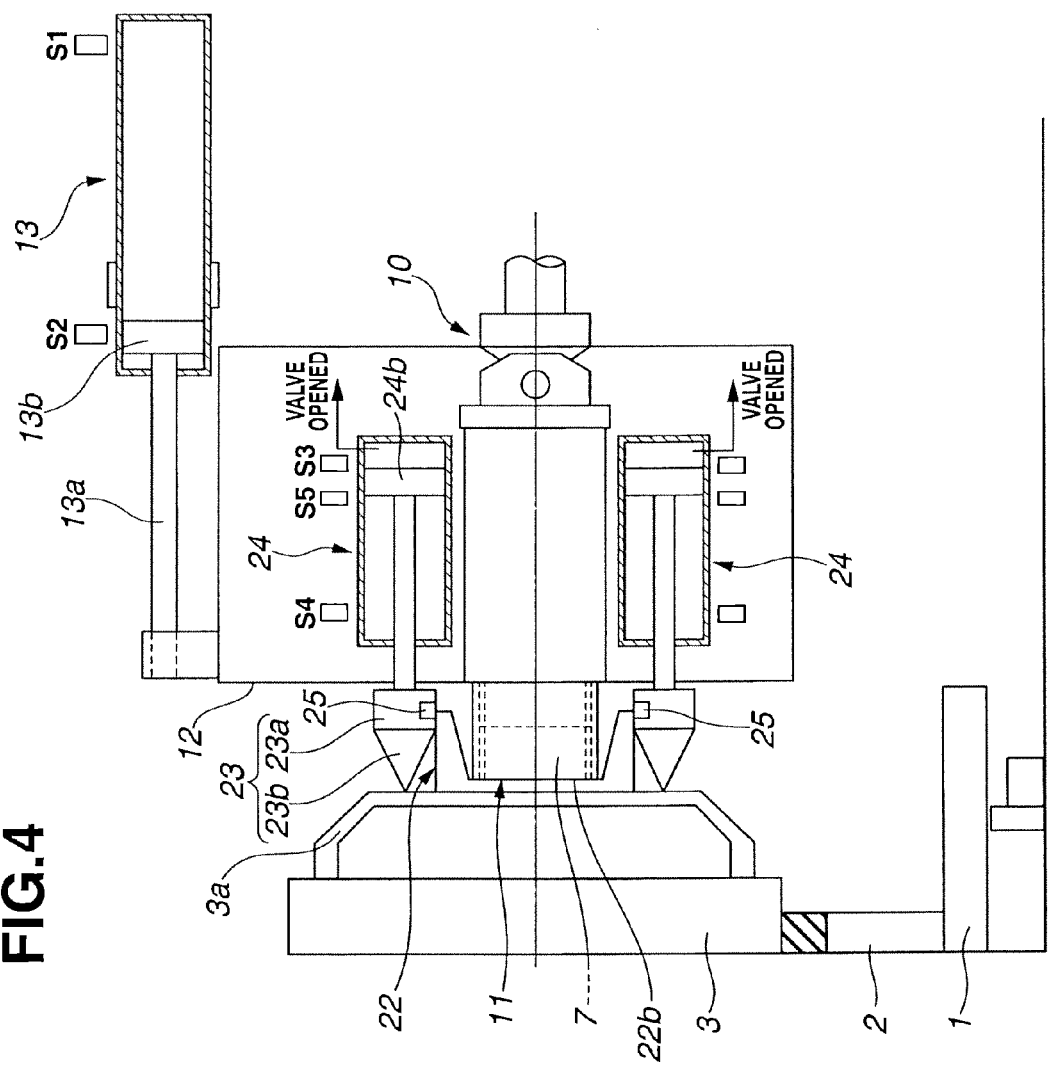
FIG. 4 is an illustration diagram showing Step 5 of the shaft connection method.
Figure 5:
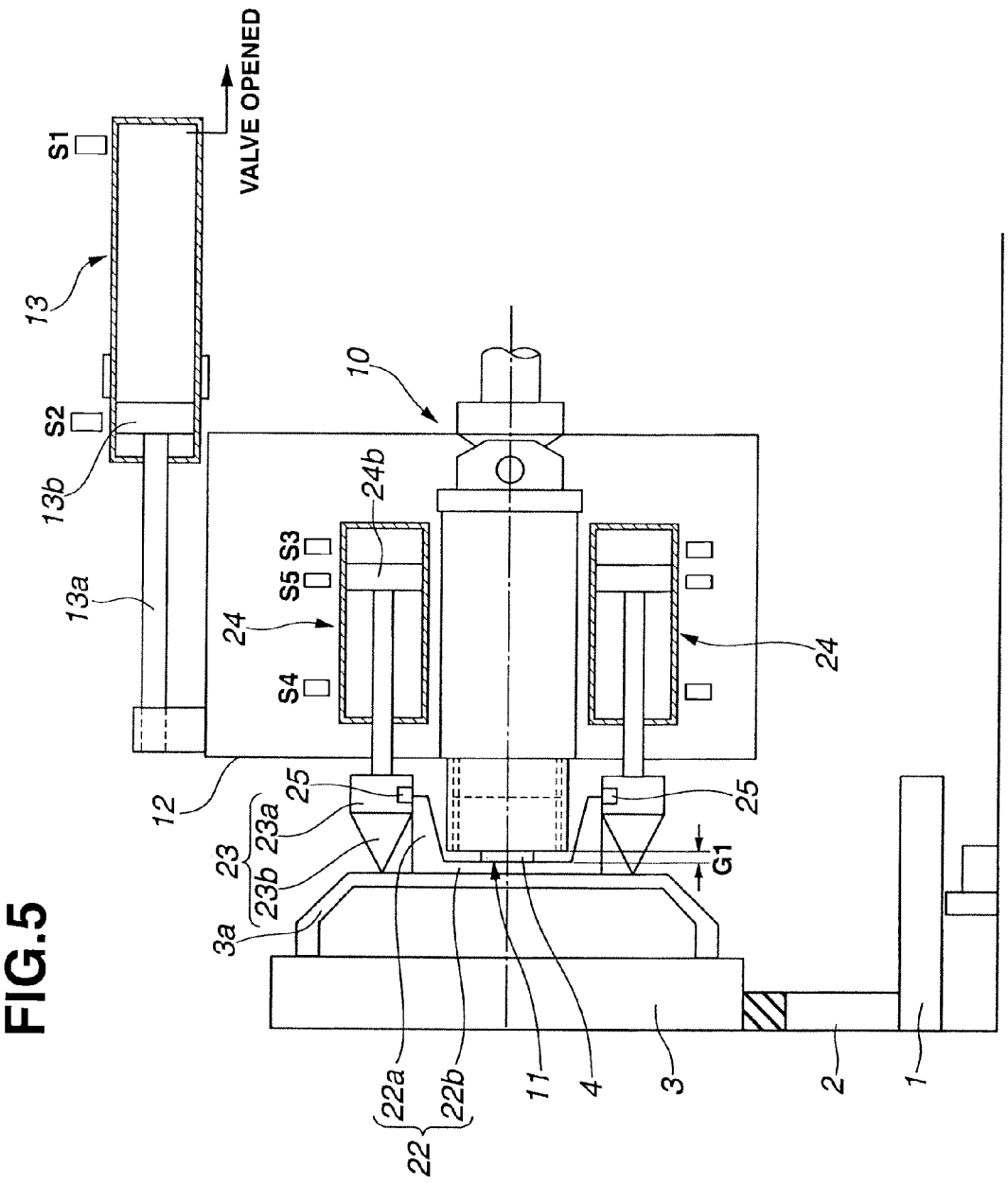
FIG. 5 is an illustration diagram showing Step 6 of the shaft connection method.

As shown in FIGS. 2 to 4, shaft connection assist device 21 serves to bring the shaft axes of spline shafts 7, 11 within a range enabling a fit therebetween. Shaft connection assist device 21 is generally as follows. In FIG. 2, centering pins 23 are made by air cylinders (referred to as auxiliary air cylinders) 24 to project. Then, as shown in FIG. 3, shaft support member 12 is made by main air cylinder 13 to travel toward the product under test 3, while shaft connection assist device 21 is used to function to substantially align the shaft axes with each other. As shown in FIG. 4, spline shaft 7 is inserted into spline shaft 11, to connect the pair of rotating shafts 4, 6.

The following describes major components of shaft connection assist device 21. Shaft connection assist device 21 is composed of a centering ring 22 and four centering pins 23, wherein centering ring 22 is arranged coaxially with spline shaft 7, and four centering pins 23 are evenly spaced around spline shaft 11. All of four centering pins 23 are made to engage with the outer peripheral surface of centering ring 22, and align the shaft axis CL1 of spline shaft 7 and shaft axis CL2 of spline shaft 11 with each other. Although only two centering pins 23, 23 are shown in FIGS. 1 to 6, other two centering pins 23, 23 are actually provided (two centering pins are omitted from the drawings in view of convenience for explanation).

Centering ring 22 is, for example, hollow-cylindrically shaped with a bottom, including a hollow-cylindrical part 22a and a bottom surface part 22b. Bottom surface part 22b is attached to a jig 3a.

Centering pin 23 includes a cylindrical part 23a and a conical part 23b, wherein cylindrical part 23a engages with the outer peripheral surface of centering ring 22 and positions the centering ring 22, and wherein conical part 23b is provided at a distal end of cylindrical part 23a and guides the outer peripheral surface of centering ring 22 to the outer peripheral surface of cylindrical part 23a.

Each of four centering pins 23 is attached to the distal end of piston rod 24a of auxiliary air cylinder 24, and configured to travel in the axial direction, wherein auxiliary air cylinder 24 is attached integrally with spline shaft 11 and serves as a pin drive member.

As shown in FIGS. 1 and 2, when the shaft axis CL1 of spline shaft 7 is not identical to the shaft axis CL2 of spline shaft 11, movement of centering pins 23 in the direction of an arrow A causes the inclined surface of conical part 23b of one of centering pins 23 to get in contact with an outer periphery 22c of the distal end surface of centering ring 22, and eliminates the deviation in shaft axis. Then, as shown in FIG. 3, when the peripheral surface of cylindrical part 23a of each centering pin 23 engages with (gets in contact with) the outer peripheral surface of centering ring 22, the shaft axis of spline shaft 7 and the shaft axis of spline shaft 11 are brought into a range enabling a fit therebetween. The condition that all of the four centering pins are engaged is detected by proximity sensors 25 that are provided for respective one of the centering pins. Thereafter, spline shafts 7, 11 are engaged with each other, as shown in FIG. 4.

In FIGS. 1 to 6, S1 represents a first sensor for detecting a most backward position of shaft support member 12, S2 represents a second sensor for detecting a most forward position of shaft support member 12, wherein the second sensor is used to implement a limiter (safety) function, S3 represents a third sensor for detecting a most backward position of centering pin 23, S4 represents a fourth sensor for detecting a most forward position of centering pin 23, and S5 represents a fifth sensor disposed between third sensor S3 and fourth sensor S4.

Figure 6:
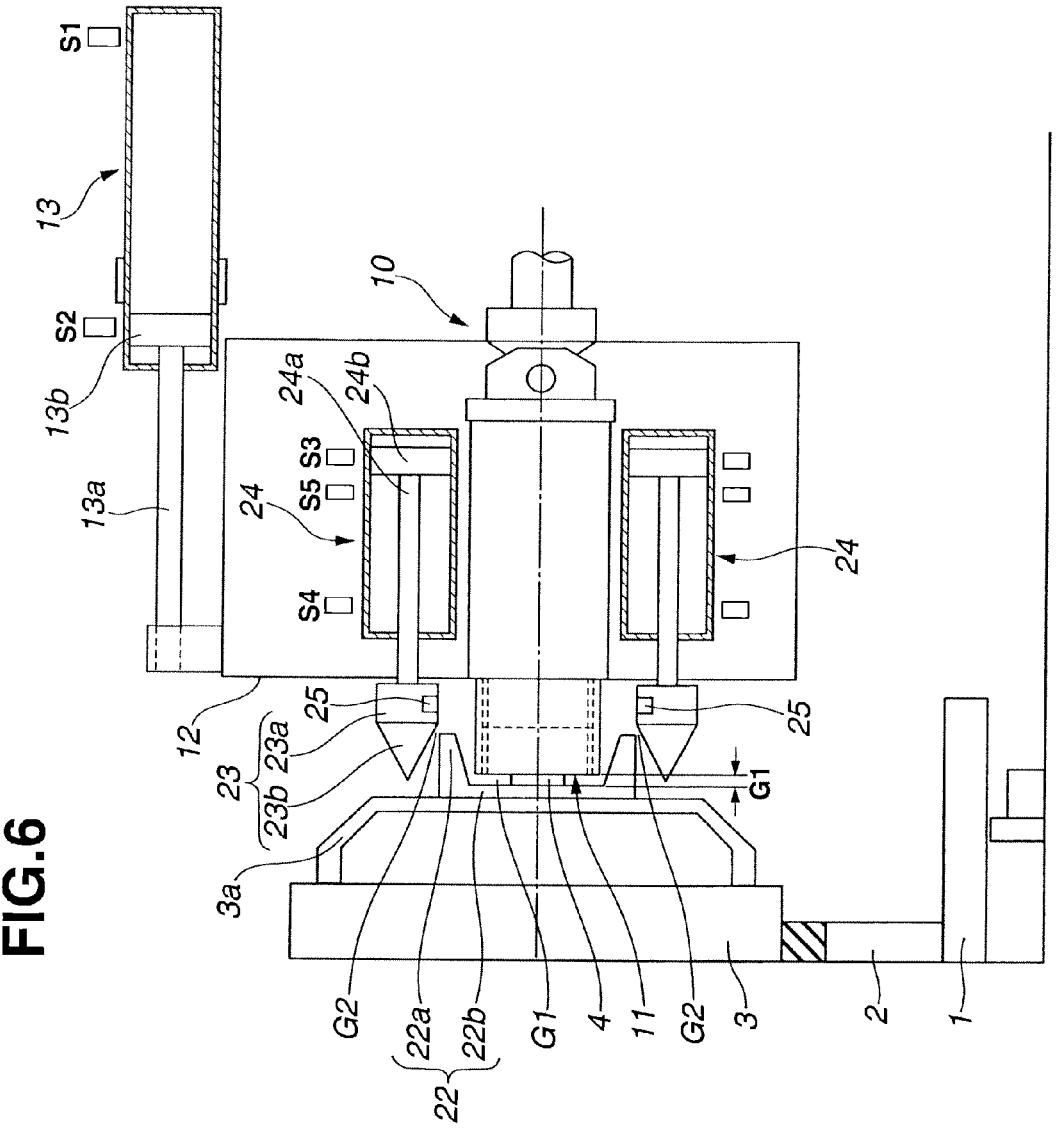
FIG. 6 is an illustration diagram showing Step 7 of the shaft connection method.
Figure 7:
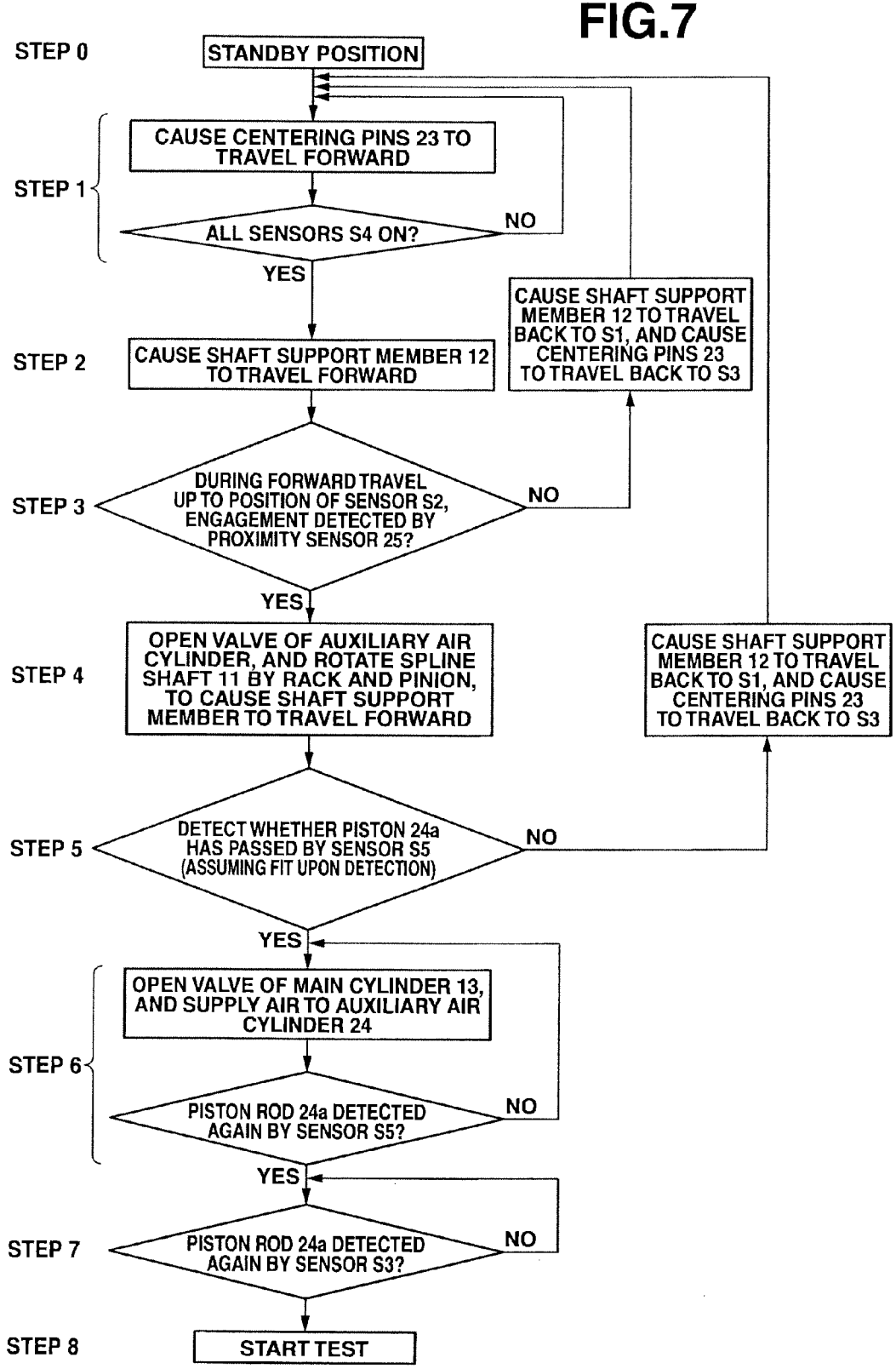
FIG. 7 is a flow chart showing a shaft connection method according to the present invention.

The following describes a method for connecting the rotating shaft 6 of dynamometer 5 to the rotating shaft 4 of engine 3 by using the shaft connection assist device 21, with reference to FIGS. 1 to 6 and the flow chart of FIG. 7 which are used to describe operation.

Step 0 in FIG. 7 indicates a standby condition shown in FIG. 1. Shaft support member 12 is set by main air cylinder 13 in a most backward position, namely in a position farthest from engine 3. Each of four centering pins 23 are set by auxiliary air cylinder 24 also in a most backward position, namely in a position farthest from engine 3.

At Step 1 in FIG. 7, four centering pins 23 are made by auxiliary air cylinders 24 to project toward the product under test 3 with respect to the distal end surface of spline shaft 11, and move until auxiliary air cylinder 24b is detected by sensor S4 (until the most forward position is detected).

FIG. 3 shows Steps 2 and 3 in FIG. 7. At Step 2, under the condition that four centering pins 23 are made to project toward product under test 3, shaft support member 12 is caused by main air cylinder 13 to travel toward product under test 3. At this moment, when the shaft axis of spline shaft 7 and the shaft axis of spline shaft 11 are out of the range enabling the fit therebetween, the inclined surface of conical part 23b of at least one of four centering pins 23 gets into contact with the outer periphery 22c of the distal end surface of centering ring 22, and as shaft support member 12 travels, the deviation in shaft axis decreases.

At Step 3, in response to detection by all proximity sensors 25 that the outer peripheral surfaces of cylindrical parts 23a of all centering pins 23 engage with (get in contact with) the outer peripheral surface of centering ring 22, it is determined that the shaft axis of spline shaft 7 and the shaft axis of spline shaft 11 are in the range enabling the fit therebetween. If all proximity sensors 25 do not detect engagement even with travel to the position of sensor S2 (maximum travel) of the main cylinder, it is assumed that centering operation has failed, so that shaft support member 12 is caused to travel back to the position of sensor S1, and each centering pin 23 is caused to travel back to the position of sensor S3, and the process is restarted from Step 1. If the centering operation fails even by two or more cycles of the process, the connecting operation is aborted.

Step 4 in FIG. 7 indicates an intermediate condition from FIG. 3 to FIG. 4. At Step 4, a valve of each of four auxiliary air cylinders 24 is opened under the condition of FIG. 3. Then, for spline shaft connection, the spline shaft is applied with a torque by rack 14 and pinion 15, and the rotating shaft is allowed to rotate at very low speed by inertial force, and shaft support member 12 is moved by main air cylinder 13. At this step, spline shaft 11 travels toward product under test 3 together with shaft support member 12. At this moment, the distal end of conical part 23b of each of four centering pins 23 is made to project into contact with the surface of jig 3a. However, it is possible to move by main air cylinder 13 the shaft support member 12 further toward product under test 3, because the valve of auxiliary air cylinder 24 is opened as described above.

FIG. 4 shows Step 5 in FIG. 7. At Step 5, it is detected that piston 24b passes by the position of sensor S5. Upon this detection, it is determined that the connection of the spline shafts is completed. However, if it is not detected that piston 24b passes by the position of sensor S5, each cylinder is returned to the standby position, and automatic connection is restarted from Step 1. Since the weight (inertia) of shaft support member 12 is large, it is impossible to completely stop the shaft support member 12 simultaneously with position detection by sensor S5. Accordingly, it is possible that the distal end surface of spline shaft 11 gets in contact with the bottom surface part 22b of centering ring 22. If the spline shaft is rotated under this condition of contact, it causes a problem that the distal end surface of spline shaft 11 slides on the bottom surface part 22b of centering ring 22.

Accordingly, as shown at Step 6 (FIG. 5), the valve of main air cylinder 13 is opened, and air is supplied again to the valve of auxiliary air cylinder 24 that has been opened at Step 4, and shaft support member 12 and spline shaft 11 are moved away from product under test 3 until piston 24b is detected again by sensor 55. This behavior produces a clearance G1 between the distal end surface of spline shaft 11 and the bottom surface part 22b of centering ring 22, and thereby makes spline shaft 11 and centering ring 22 out of contact with each other.

At Step 7 in FIG. 7, centering pins 23 are made to travel in the direction away from centering ring 22 in FIG. 6 by supplying air to the auxiliary air cylinders until piston 24b is detected by sensor S3. This behavior produces a clearance G2 between each centering pin 23 and centering ring 22, and thereby makes each centering pin 23 and centering ring 22 out of contact with each other.

Then, at Step 8, a test is started. As described above, clearance G1 serves to make the distal end surface of spline shaft 11 and the bottom surface part 22b of centering ring 22 out of contact with each other, whereas clearance G2 serves to make each centering pin 23 and centering ring 22 out of contact with each other. This allows to perform an engine test without causing frictional resistances therebetween.

Figure 8:
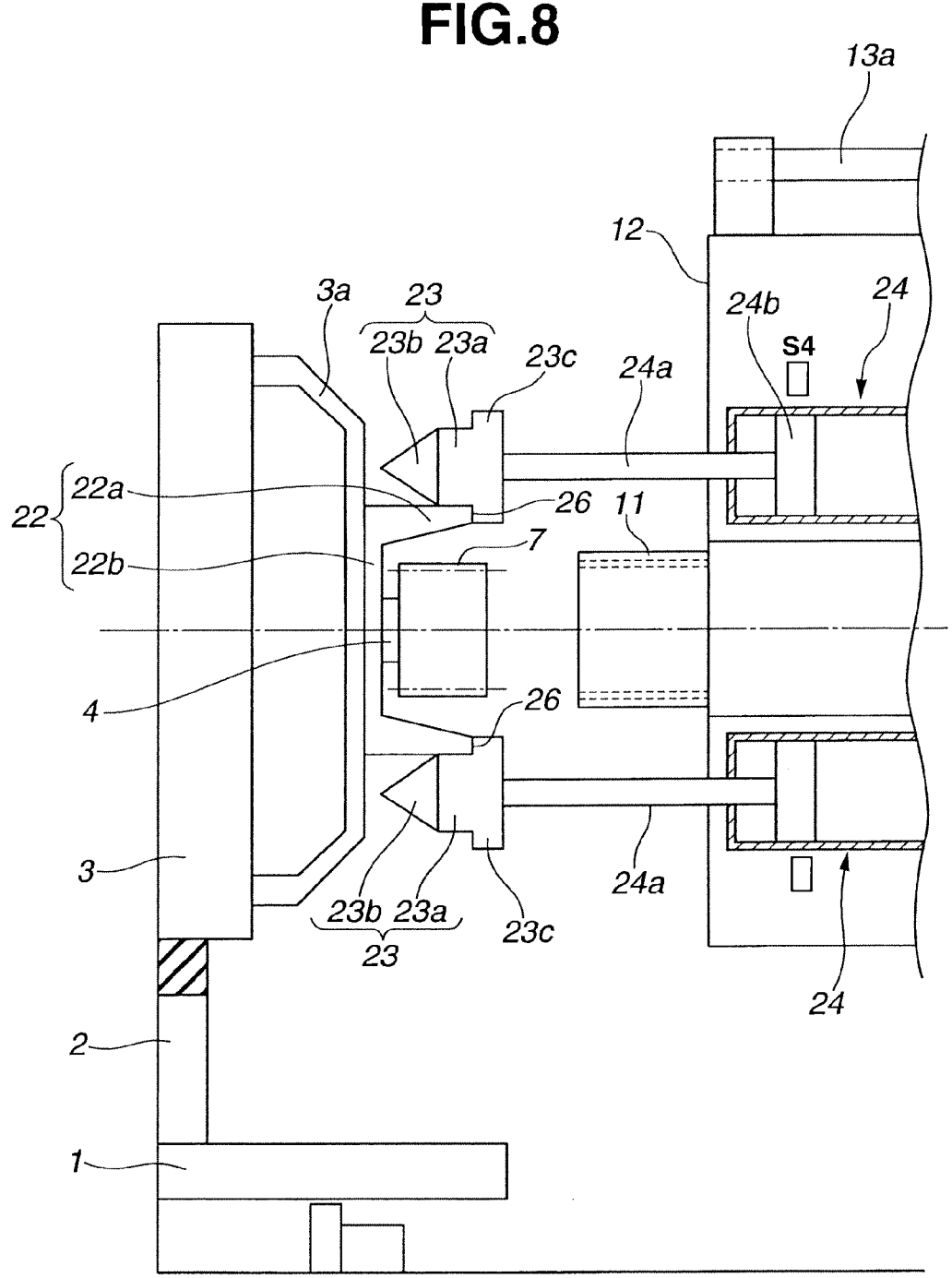
FIG. 8 is an illustration diagram showing a second embodiment.

FIG. 8 shows a second embodiment. Although the distal end portion of centering pin 23 is brought into contact with engine cover 3a in the first embodiment, this embodiment may be configured as shown in FIG. 8 so that the cylindrical part 23a of centering pin 23 is formed with a flange part 23c which is brought into contact with the distal end surface of hollow-cylindrical part 22a of centering ring 22. In a case where the distal end portion of centering pin 23 is brought into contact with engine cover 3a, the distal end portion of centering pin 23 or engine cover 3a may be damaged because a contact pressure is concentrated at the distal end portion of centering pin 23. On the other hand, in a case where flange part 23c is brought into contact with the distal end surface of hollow-cylindrical part 22a of centering ring 22, the contact pressure can be distributed all over the distal end surface of centering ring 22. Provision of a contact sensor 26 at the contact surface between flange part 23c and centering pin 23 makes it possible to detect that spline shaft 7 has fitted in spline shaft 11. The other configuration is the same as in the first embodiment, and description thereof is omitted to avoid repetition.

Although the first and second embodiments are shown for the case that the shaft support member drive member and the pin drive member are implemented by air cylinders, one or both of the shaft support member drive member and the pin drive member may be implemented by servo motors or hydraulic cylinders. Moreover, the number of centering pins 23 is not limited to four, but may be any other number greater than or equal to three.

FIGS. 9 to 14 show a third embodiment.

In the first and second embodiments, spline connection can be easily implemented by using the shaft connection assist device 21. However, it is impossible to prevent shaft runout after the spline connection.

The third embodiment is configured so that shaft connection assist device 21 is used to easily perform spline connection, and a shaft runout prevention mechanism is used to prevent shaft runout after the spline connection.

Prior to description of the third embodiment, the following describes a problem with a spline-based shaft connection structure. <1> When spline shaft 104 and spline shaft 107 are fitted with each other, a clearance (play) between a spline groove of spline shaft 104 and a spline groove of spline shaft 107 causes shaft runout and the like. This clearance is essential to smoothly perform a fit between spline shaft 104 and spline shaft 107. As the clearance increases, it becomes easier to achieve the fit between spline shaft 104 and spline shaft 107, but the shaft runout becomes significant. Especially in a case where a rotor such as a motor or engine which is spline-connected is fixed through an elastic member such as a rubber mount member, the position of the axis of the product under test gets unstable or moves, causing a problem that the error in the fit between the male and female spline shafts 104, 107 causes oscillation and resonance. This is because spline connection serves to transmit a force in the axial direction but the fixing in the direction perpendicular to the axial direction is insufficient because of the error in spline connection fitting. Shaft runout or resonance tends to occur, especially if shaft support member 108 that supports the dynamometer-side spline shaft 107 is a floating bearing as disclosed by patent document 3. <2> Contrary to the case of <1>, as the clearance decreases, it becomes more effective to suppress shaft runout, but it becomes difficult to achieve the fit between spline shaft 104 and spline shaft 107. For a method for suppressing shaft runout and the like without setting the clearance small, it is conceivable to set large the range of the fit between the spline shafts, set the clearance small, and thereby strengthen the fixing in the direction perpendicular to the axial direction. However, this results in an increase in the length of the connected shaft, and further requires an amount of stroke of shaft support member drive mechanism 109 of FIG. 15, thereby producing a problem that the whole size of the device becomes large.

The third embodiment is configured to solve the problem with the conventional system described above, and to reliably suppress shaft runout. The third embodiment is configured to solve the problem and to reliably suppress the shaft runout without setting the clearance so small as to make the fit between the spline shafts difficult, and without setting the spline shafts so long as to cause an increase of the size of the device based on the spline connection structure.

Figure 9:
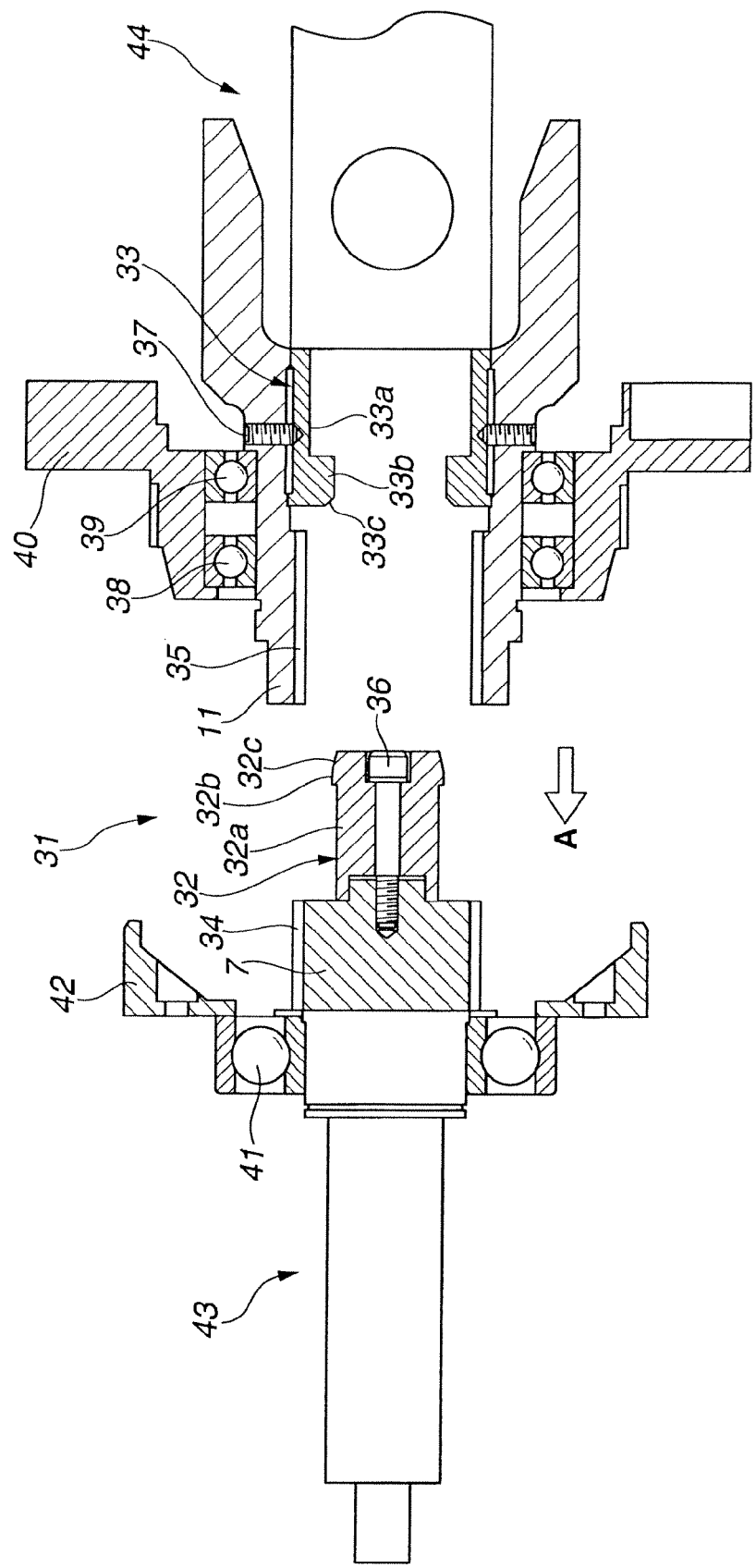
FIG. 9 is an illustration diagram showing a major part of a third embodiment.

FIG. 9 is a cross-sectional view showing a major part of the shaft connection structure according to the third embodiment. The shaft connection structure of the third embodiment includes a similar shaft connection assist device as the shaft connection assist device in the first embodiment, and shaft runout prevention mechanism 31 for preventing shaft runout of the male and female spline shafts 7, 11 that has been spline-connected to each other with the shaft connection assist device.

The shaft connection structure of the third embodiment is configured as in the first embodiment and as follows, although omitted from the drawings. A centering ring is arranged outside of a first spline shaft and coaxially with the first spline shaft. On the other hand, centering pins are arranged outside of a second spline shaft, and configured to engage with the outer peripheral surface of the centering ring, to bring the shaft axis of the first spline shaft and the shaft axis of the second spline shaft into a range enabling a fit therebetween. The following describes shaft runout prevention mechanism 31.

As shown in FIG. 9, shaft runout prevention mechanism 31 is composed of the male and female spline shafts 7, 11, and a locating pin 32 and a bush 33 which fit with each other at spline connection, specifically, after spline connection between the male and female spline shafts 7, 11.

The male spline shaft 7 is cylindrically shaped, and provided with spline teeth 34 at the outer peripheral surface.

The female spline shaft 11 is hollow-cylindrically shaped, and provided with spline teeth 35 at the inner peripheral surface, wherein spline teeth 35 mesh with spline tooth 34 of the male spline shaft 7.

The locating pin 32 is cylindrically shaped, and is attachable to and detachable from the distal end surface of the cylindrically shaped male spline shaft 7 by a locating pin fixing bolt 36.

The bush 33 is hollow-cylindrically shaped, and attached to the inner periphery of the hollow-cylindrically shaped female spline connection part 11 by a bush fixing bolt 37.

Figure 10:
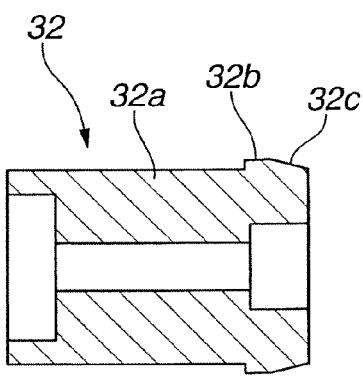
FIG. 10 is a cross-sectional view of a locating pin.

As shown in FIG. 10, the locating pin 32 includes a small-diameter shaft part 32a and a large-diameter shaft part 32b, wherein the large-diameter shaft part 32b is continuous with a distal end of small-diameter shaft part 32a and has a little larger diameter than small-diameter shaft part 32a.

The distal end of the large-diameter shaft part 32b is formed with an insertion guide surface 32c, wherein insertion guide surface 32c has a diameter that gradually decreases as followed toward the distal end, for easy insertion into the bush 33.

Figure 11:
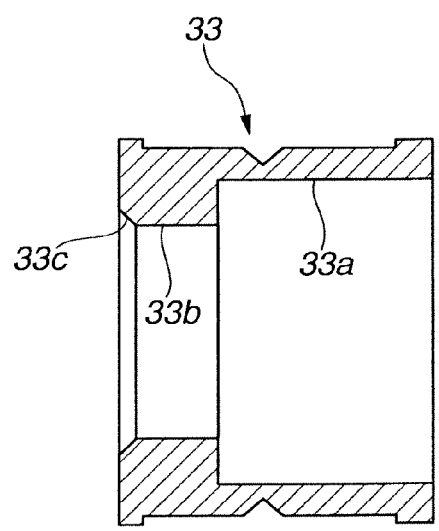
FIG. 11 is a cross-sectional view of a bush.

As shown in FIG. 11, the bush 33 includes a large-inner-diameter part 33a and a small-inner-diameter part 33b, wherein the small-inner-diameter part 33b is continuous with the distal end of large-inner-diameter part 33a.

The distal end of the small-inner-diameter part 33b is formed with an insertion guide surface 33c similarly, wherein insertion guide surface 33c has a diameter that gradually decreases as followed toward the distal end, for easy insertion of the locating pin 32.

The locating pin 32 can be smoothly fitted if made of a self-lubricating and/or elastic material such as synthetic resin or rubber than when made of metal.

When locating pin 32 and bush 33 are fitted with each other, the outer surface of large-diameter shaft part 32b of locating pin 32 gets in contact with the inner surface of small-inner-diameter part 33b of bush 33.

As shown in FIG. 9, the female spline shaft 11 is rotatably supported by a pair of bearings 38, 39 with respect to a shaft support member 40. The shaft support member 40 is implemented by a floating type shaft support member. The male spline shaft 7 is rotatably supported through a bearing 41 with respect to a support member 42.

Figure 12:
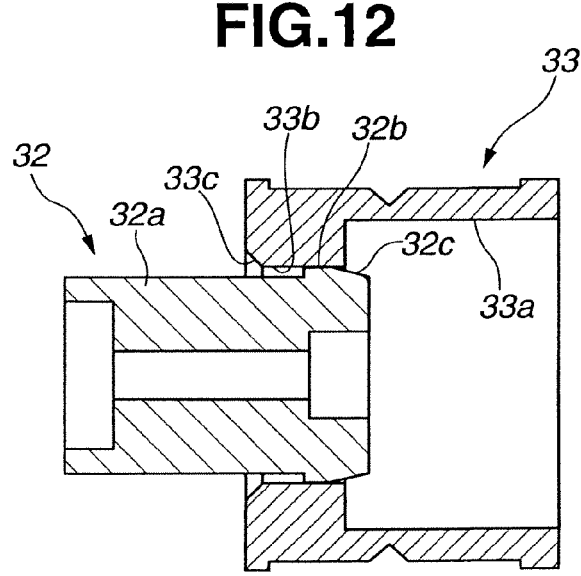
FIG. 12 is a cross-sectional view of a condition where the locating pin and the bush are fitted with each other.

As shown in FIG. 12, when the locating pin 32 and bush 33 are fitted with each other, the inner surface of small-inner-diameter part 33b of bush 33 in contact with large-diameter shaft part 32b of locating pin 32 is located between the pair of bearings 38, 39.

In the embodiment, the male spline shaft 7 is connected to a rotating shaft 43 of a product under test that is to be tested by a dynamometer, whereas the female spline shaft 11 is connected to a rotating shaft 44 of the dynamometer.

Figure 13:
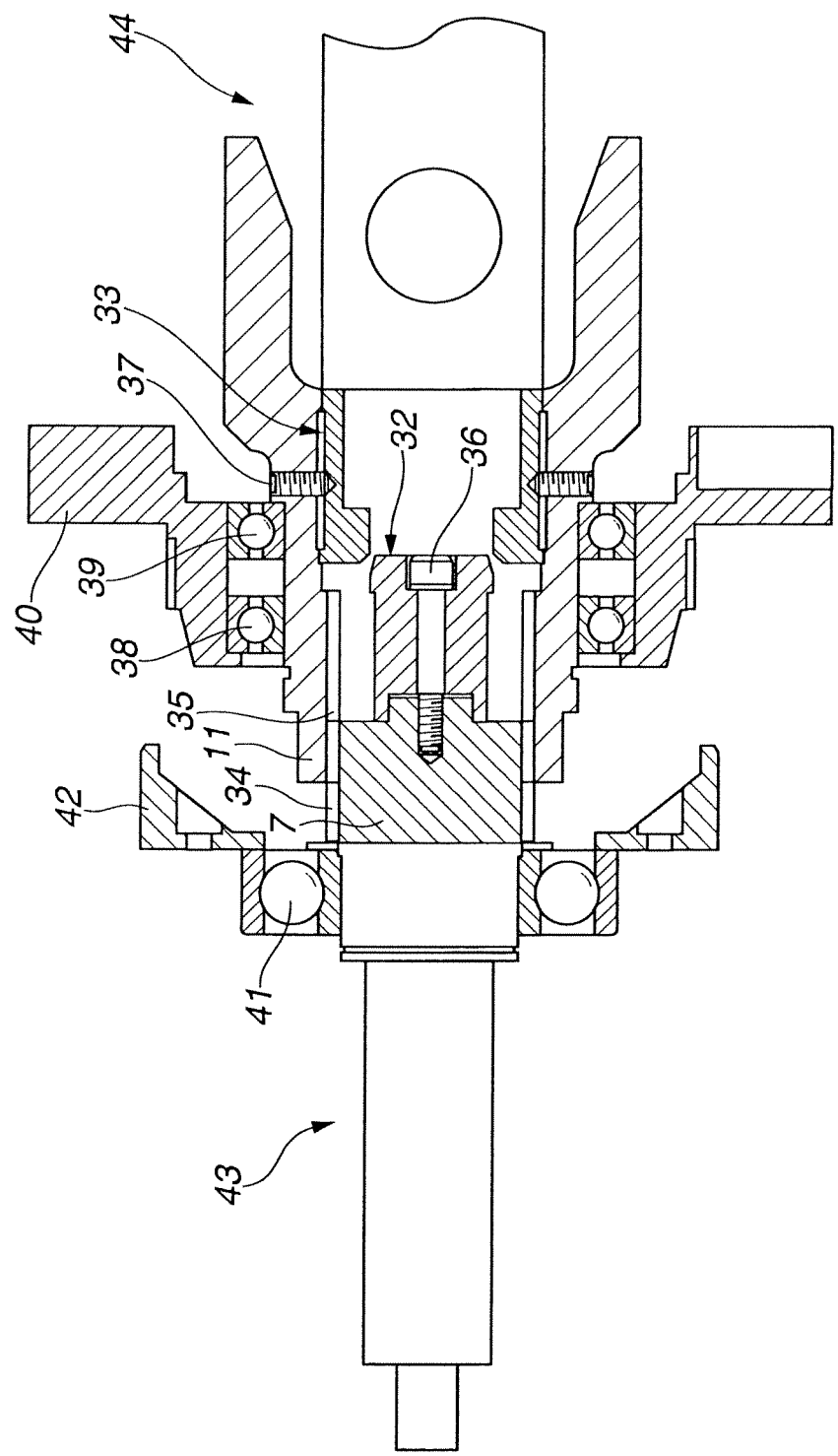
FIG. 13 is a cross-sectional view of a condition where a male spline shaft and a female spline shaft are fitted with each other.

In the shaft connection structure of the third embodiment having the construction described above, the shaft connection assist device similar to shaft connection assist device 21 of the first embodiment, which is omitted from the drawings, is used to align the shaft axis of spline shaft 7 and the shaft axis of spline shaft 11 with each other, and first cause the first the female spline shaft 11 to travel in the direction of arrow A of FIG. 9, to insert the male spline shaft 7 into the female spline shaft 11, as shown in FIG. 13.

When a specific portion of the male spline shaft 7 is inserted into the female spline shaft 11, the large-diameter shaft part 32b at the distal end of locating pin 32 is inserted into bush 33 smoothly by the insertion guide surfaces 32c, 33c, and the fit therebetween is carried out with no clearance between the large-diameter shaft part 32b of locating pin 32 and the small-inner-diameter part 33b of bush 33.

Then, as shown in FIG. 14, at the moment when the distal end portion of the female spline shaft 11 gets into contact with the support member 42 to complete spline connection, the outer surface of large-diameter shaft part 32b of locating pin 32 is in contact with the inner surface of small-inner-diameter part 33b of bush 33, preventing shaft runout between the male and female spline shafts 7, 11, and preventing shaft runout between the rotating shaft 43 of the product under test and the rotating shaft 44 of the dynamometer.

Incidentally, although the embodiment is described for the case where the male spline shaft 7 is connected to the rotating shaft 43 of the product under test that is to be tested by the dynamometer, and the female spline shaft 11 is connected to the rotating shaft 44 of the dynamometer, this may be modified so that the female spline shaft 11 is connected to the rotating shaft 43 of the product under test and the male spline shaft 7 is connected to the rotating shaft 44 of the dynamometer.

Although the embodiment described above is configured so that the locating pin 32 is attached and detached by locating pin fixing bolt 36 to and from the distal end of the male spline shaft 7, this may be modified so that locating pin 32 is formed integrally with the distal end of the male spline shaft 7.

The embodiment described above is configured so that the locating pin 32 includes a small-diameter shaft part 32a and a large-diameter shaft part 32b, wherein the large-diameter shaft part 32b is continuous with the distal end of small-diameter shaft part 32a and has a little larger diameter than small-diameter shaft part 32a, and the bush 33 includes a large-inner-diameter part 33a and a small-inner-diameter part 33b, wherein the small-inner-diameter part 33b is continuous with the distal end of large-inner-diameter part 33a, and when locating pin 32 and bush 33 are fitted with each other, the outer surface of large-diameter shaft part 32b of locating pin 32 gets in contact with the inner surface of small-inner-diameter part 33b of bush 33. However, this may be configured so that the inner diameter of bush 33 is set uniform, and the locating pin 32 is solely provided with a small-diameter shaft part 32a and a large-diameter shaft part 32b, wherein the large-diameter shaft part 32b is continuous with the distal end of small-diameter shaft part 32a and has a little larger diameter than small-diameter shaft part 32a, and the outer surface of the large-diameter shaft part 32b is brought into contact with the inner surface of bush 33. Conversely, it may be configured so that the locating pin 32 has a uniform outer diameter, and bush 33 is solely provided with a large-inner-diameter part 33a and a small-inner-diameter part 33b, wherein the small-inner-diameter part 33b is continuous with the distal end of large-inner-diameter part 33a, and the outer surface of locating pin 32 is brought into contact with the inner surface of the small-inner-diameter part 33b.

Although the embodiment is described for the case where both of locating pin 32 and bush 33 are provided with insertion guide surfaces 32c, 33c, this may be modified so that one of locating pin 32 and bush 33 is provided with an insertion guide surface.

INDUSTRIAL APPLICABILITY

Although the embodiments are described for the specific case where the engine is connected to the dynamometer, the shaft connection assist device and shaft connection method according to the present invention are not limited to cases where an engine is connected to a dynamometer, but also applicable to a broad area of cases where two rotating shafts are connected to each other by spline shaft fitting.

The invention claimed is:

1. A shaft connection structure for connecting a pair of rotating shafts by a fit between a pair of spline shafts, wherein the pair of rotating shafts are provided with corresponding ones of the pair of spline shafts, the shaft connection structure comprising a shaft connection assist device, wherein the shaft connection assist device comprises:
    a centering ring arranged outside of a first spline shaft of the pair of spline shafts and coaxially with the first spline shaft; and
    centering pins provided outside of a second spline shaft of the pair of spline shafts,
    wherein the centering pins engage with an outer peripheral surface of the centering ring and bring a shaft axis of the first spline shaft and a shaft axis of the second spline shaft into a range enabling the fit therebetween.

2. The shaft connection structure as claimed in claim 1, wherein:
    each of the centering pins comprises a cylindrical part and a conical part;
    the cylindrical part engages with the outer peripheral surface of the centering ring and positions the centering ring; and
    the conical part is provided at a distal end of the cylindrical part, and brings the shaft axes of the pair of spline shafts into the range enabling the fit therebetween by abutting on the outer peripheral surface of the centering ring.

3. The shaft connection structure as claimed in claim 2, wherein:
    the cylindrical part includes a flange part; and
    the flange part gets into contact with a distal end surface of the centering ring, when the cylindrical part engages with the outer peripheral surface of the centering ring.

4. The shaft connection structure as claimed in claim 1, wherein:
    one of the pair of rotating shafts to be connected to each other is a rotating shaft of a product under test;
    another one of the pair of rotating shafts is a rotating shaft of a testing device for testing the product under test;
    the first spline shaft is attached to the rotating shaft of the product under test;
    the second spline shaft is attached to the rotating shaft of the testing device;
    the second spline shaft is attached to a shaft support member;
    axial movement of the shaft support member is allowed by a shaft support member drive member; and
    axial movement of each of the centering pins is allowed by a pin drive member.

5. The shaft connection structure as claimed in claim 4, wherein:
    the pin drive member causes three or more of the centering pins to travel individually toward the product under test for engaging with the outer peripheral surface of the centering ring and bringing the shaft axis of the first spline shaft and the shaft axis of the second spline shaft into the range enabling the fit therebetween; and
    the shaft support member drive member causes the shaft support member to travel toward the product under test for causing the fit between the first spline shaft and the second spline shaft.

6. The shaft connection structure as claimed in claim 4, wherein the shaft support member drive member and the pin drive member are air cylinders.

7. The shaft connection structure as claimed in claim 4, wherein the shaft support member drive member and the pin drive member are servo motors or hydraulic cylinders.

8. The shaft connection structure as claimed in claim 1, wherein:
the pair of spline shafts are provided with a shaft runout prevention mechanism;
the shaft runout prevention mechanism comprises a locating pin and a bush; and
the locating pin and the bush are brought into intimate contact with and fitted with each other at a spline connection.

9. The shaft connection structure as claimed in claim 8, wherein:
the first spline shaft is cylindrically shaped with a spline tooth at an outer peripheral surface;
the second spline shaft is hollow-cylindrically shaped with a spline tooth at an inner peripheral surface;
the spline tooth of the second spline shaft meshes with the spline tooth of the first spline shaft;
the locating pin is cylindrically shaped, and disposed at a distal end surface of a connection part of the cylindrically shaped first spline shaft; and
the bush is hollow-cylindrically shaped, and disposed inside of the hollow-cylindrically shaped second spline shaft.

10. The shaft connection structure as claimed in claim 9, wherein at least one of the locating pin and the bush is attachable to and detachable from at least one of the distal end surface of the connection part of the first spline shaft and the inner surface of the second spline shaft.

11. The shaft connection structure as claimed in claim 9, wherein:
the second spline shaft is rotatably supported by a pair of bearings with respect to a shaft support member; and
an inner peripheral surface of a small-inner-diameter part of the bush configured to be in contact with the locating pin is located inside of the pair of bearings.

12. The shaft connection structure as claimed in claim 11, wherein the shaft support member is of a floating type.

13. The shaft connection structure as claimed in claim 8, wherein:
the locating pin includes a small-diameter shaft part and a large-diameter shaft part;
the large-diameter shaft part is continuous with a distal end of the small-diameter shaft part;
the bush includes a small-inner-diameter part and a large-inner-diameter part;
the large-inner-diameter part is continuous with the small-inner-diameter part;
fitting between the locating pin and the bush brings an outer surface of the large-diameter shaft part of the locating pin into contact with an inner surface of the small-inner-diameter part of the bush.

14. The shaft connection structure as claimed in claim 13, wherein at least one of the large-diameter shaft part of the locating pin and the small-inner-diameter part of the bush includes an insertion guide surface for guiding insertion of the other.

15. The shaft connection structure as claimed in claim 8, wherein:
the first spline shaft is provided at a rotating shaft of a product under test to be tested by a dynamometer; and
the second spline shaft is provided at a rotating shaft of the dynamometer.

16. The shaft connection structure as claimed in claim 8, wherein the locating pin is made of synthetic resin or rubber.

17. A shaft connection method, comprising:
attaching a first spline shaft to a rotating shaft of a product under test;
arranging a centering ring outside of the first spline shaft and coaxially with the first spline shaft;
attaching a second spline shaft to a rotating shaft of a testing device for testing the product under test;
attaching a plurality of centering pins to a shaft support member to which the second spline shaft is attached, in a manner to allow axial movement of the centering pins by a pin drive member;
allowing axial movement of the shaft support member by a shaft support member drive member;
causing by the pin drive member the plurality of centering pins to travel toward the product under test, to engage with an outer peripheral surface of the centering ring, and to bring a shaft axis of the first spline shaft and a shaft axis of the second spline shaft into a range enabling a fit therebetween; and thereafter
causing the second spline shaft to travel forward and cause the fit between the first spline shaft and the second spline shaft.

18. The shaft connection method as claimed in claim 17, further comprising:
causing by an auxiliary air cylinder the plurality of centering pins to project toward the product under test with respect to a distal end surface of the second spline shaft, when in a standby position;
causing by a main air cylinder the shaft support member to travel toward the product under test under condition that the plurality of centering pins are made to project toward the product under test, and eliminate a deviation between the shaft axes of the spline shafts by the centering ring and the plurality of centering pins;
detecting whether all of the centering pins engage with the outer peripheral surface of the centering ring and the shaft axes of the spline shafts are in the range enabling the fit therebetween;
opening a valve of the auxiliary air cylinder after completion of alignment of the shaft axes of the spline shafts, and causing by the main air cylinder the shaft support member to travel, to cause the fit between the spline shafts, and to cause the distal end surface of the second spline shaft to get in contact with a bottom surface part of the centering ring;
making the distal end surface of the second spline shaft and the bottom surface part of the centering ring out of contact with each other by producing a clearance therebetween; and
a step of making the centering pins out of contact with the centering ring by producing clearances therebetween.

* * * * *